No. 663,283.  
J. LEE, Sr.  
WRENCH.  
(Application filed Mar. 31, 1900.)  
Patented Dec. 4, 1900.
(No Model.)
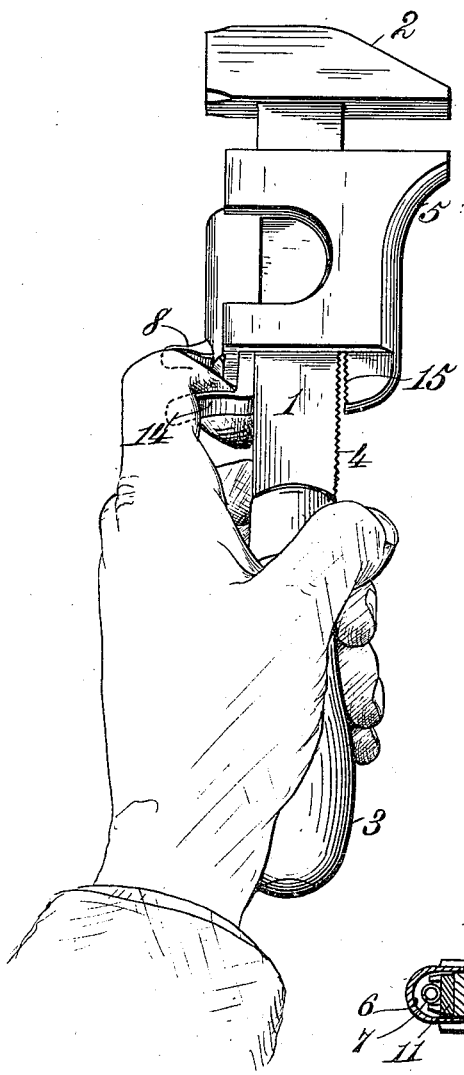
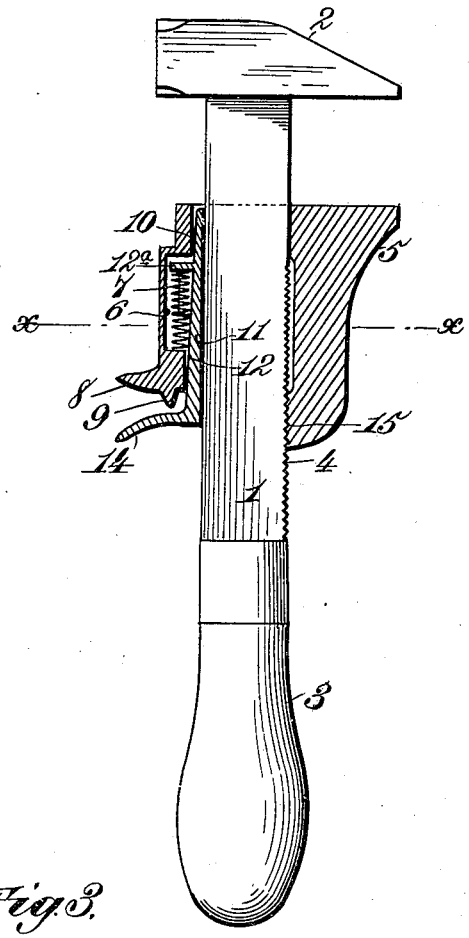
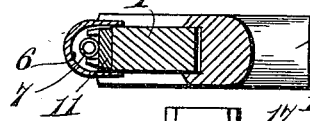
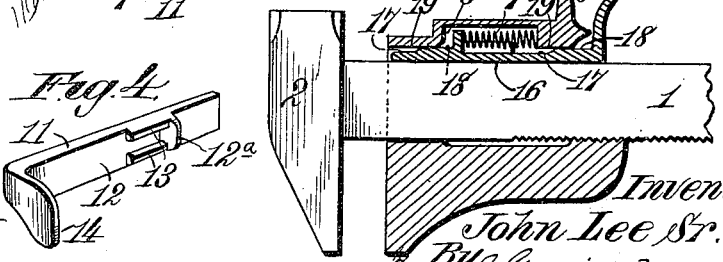
Witnesses  
Robert Orrutt  
W. H. Clarke.
Inventor:  
John Lee Sr.  
By J. Granville Meyers  
Atty.

UNITED STATES PATENT OFFICE.

JOHN LEE, SR., OF STERLING, OHIO, ASSIGNOR OF THREE-FOURTHS TO D. B. GRABER AND P. C. STEINER, OF SAME PLACE, AND C. A. STEINHOFF, OF MEDINA, OHIO.

WRENCH.

SPECIFICATION forming part of Letters Patent No. 663,283, dated December 4, 1900.

Application filed March 31, 1900. Serial No. 10,903. (No model.)

*To all whom it may concern:*

Be it known that I, JOHN LEE, Sr., a citizen of the United States, residing at Sterling, Wayne county, State of Ohio, have invented certain new and useful Improvements in Wrenches, of which the following is a specification.

My present invention relates to certain new and useful improvements in wrenches, and particularly to that type of wrenches wherein the movable jaw will be automatically locked when moved to its adjusted position and released; and it has for its object to provide an implement of this character having a comparatively small number of operating parts, the construction and operation of which are such that they are not likely to get out of order.

Briefly and specifically stated, the invention comprises a shank having teeth or serrations on the upper edge thereof and a fixed jaw at one end and a movable jaw freely mounted on the shank, said jaw having a plurality of teeth at its outer upper portion which mesh with the teeth or serrations on the shank, combined with a longitudinally-movable spring-actuated locking-key interposed between the lower edge of the shank and movable jaw and normally held under the action of a coiled spring in position to lock the jaw to the shank, the said locking-key and movable jaw being each provided with a finger-piece or projection which normally lie in close parallelism and between which a finger of the hand may be passed, whereupon the said locking-key will be withdrawn from its locking position and the movable jaw freed to be shifted or moved as desired, the whole operation being easily and quickly accomplished with one hand.

In order to convey a better idea of my invention and to enable others to make and use the same, I will proceed with a detail description thereof, reference being had for this purpose to the accompanying drawings, wherein—

Figure 1 is a perspective view of my improved wrench. Fig. 2 is a plan view thereof, the movable jaw being shown in section. Fig. 3 is a section taken on the line $x$ $x$, Fig. 2. Fig. 4 is a detail perspective view of the locking-key. Fig. 5 is a slightly-modified arrangement of the invention.

Referring now to the drawings, the reference-numeral 1 designates the shank of the wrench, having a fixed jaw 2 at one end and a handle 3 at the opposite end, the said shank being provided with teeth or serrations 4 on one side edge throughout a portion of its length, as clearly shown in the drawings. The numeral 5 indicates the movable jaw, which is provided with a longitudinal opening therethrough corresponding in shape to, but slightly wider than, the width of the shank 1, so that said jaw may pass freely thereover and be longitudinally adjusted thereon. The said jaw 5 is provided on its under side with a longitudinal depression or housing 6, in which is located or housed a spiral spring 7, said recess opening on one side into the longitudinal opening in the movable jaw. The jaw is further provided on its under side, at the outer end, with an outwardly-extending finger-piece 8, having a stop-lug 9 thereon, the purpose of which parts will presently appear. Fitting between the under side of the shank 1 and the inner wall 10 of the movable jaw is a longitudinally-movable locking-key 11, which, as shown in Fig. 2, is provided with an inclined wall or face 12, acting upon the wall 10 of the jaw, and said key is provided on its under side with a lip $12^a$, against which one end of the spiral spring 7 acts to normally force and hold the key in its locking position, said lip moving freely in the depression 6. The said key is also provided adjacent to the lip $12^a$ with two parallel ribs 13, which act to center the spring on the lip, and at its outer end the locking-key is provided with an outwardly-extending finger-piece 14, which normally lies parallel with and close to the corresponding finger-piece 8 on the movable jaw; but said finger-piece 14 on the locking-key is held at a slight distance away from the finger-piece 8 by means of the stop-lug 9 in order that a finger of the operator may be readily inserted between said finger-pieces, which insertion of the finger acts to withdraw the locking-key. The movable jaw is provided on the upper outer wall forming the longitudinal opening therethrough with teeth or serrations 15, as shown, which are caused to mesh with the teeth or serrations on the shank 1 when the locking-key is in its locking position, as clearly indicated in Fig. 2.

The operation of the wrench thus far described will be readily understood. Assuming the parts to be in the position shown in Fig. 2, if it is desired to adjust the movable jaw to an object to be gripped the operator places his finger between the finger-pieces 8 and 14, which latter normally lie in close parallelism, so that the act of thus placing the finger between these finger-pieces causes the locking-key to be withdrawn against the action of the spring 7, and the pressure exerted in inserting the finger forces the outer end of the jaw up, as shown in Fig. 1, so that the teeth 15 thereon will be lifted out of engagement with the teeth on the shank. The locking action of the key being now relieved, the jaw may be freely moved along the shank, as desired, the finger-piece 8 on the movable jaw serving as a bearing-surface for the finger in moving the jaw in one direction and the finger-piece 14 acting in a similar manner when moving the jaw in the opposite direction, it being understood that the finger when remaining between the finger-pieces holds the locking-key withdrawn, so that the jaw may be moved freely back and forth on the shank. Immediately the finger is withdrawn from between the finger-pieces the spring 7 acting against the lip 12ᵃ on the locking-key forces the same forward into its locking position, at the same time drawing the teeth 15 of the jaw into engagement with the shank, thus firmly locking the said jaw against movement.

In the modified arrangement of the invention illustrated in Fig. 5 the shank and movable jaw are precisely the same as the corresponding parts heretofore described, the only change being in the locking-key. In this instance the key 16 instead of being provided with an inclined face, as shown in the other embodiment of the invention, has its outer wall formed with two depressions 17 and two faces 18, which lie parallel to the opposite wall of the key, as will be seen from the drawings. In its locking position the faces 18 act against the adjacent walls 19 of the movable jaw and cause the toothed portions of the jaw and shank, respectively, to interlock. In its free position the key is drawn out, so that the depressions 17 come opposite the walls 19 on the movable jaw, thus enabling the toothed portions of the jaw and shank, respectively, to separate.

From the foregoing it will be seen that I provide a wrench comprising a small number of simple and easily-constructed parts, which enables the device to be manufactured at a low cost, and at the same time the construction is such that the parts are not likely to get out of order.

I consider the arrangement of finger-pieces on the locking-key and movable jaw, respectively, as constituting an important feature of my invention, since by this particular arrangement of parts the wrench may be readily operated with one hand. The particular arrangement of locking-key and housing for the spring is also important, as since these parts are covered or inclosed they are not likely to become broken or disarranged.

Having thus described my invention, what I claim is—

1. In a wrench, the combination with a shank having a fixed jaw at one end, of a movable jaw mounted to move on the shank, a finger-piece extending outward from the movable jaw, a locking-key mounted to move longitudinally between the said shank and movable jaw, and a finger-piece on one end of the key arranged in close relation to and facing the finger-piece on the movable jaw, substantially as described.

2. In a wrench, the combination with a shank having a fixed jaw, of a movable jaw mounted to move on the shank, a finger-piece extending outward from the movable jaw, a spring-actuated locking-key mounted to move longitudinally between the shank and movable jaw, and a finger-piece on the outer end of the key, arranged in close relation to and facing the finger-piece on the movable jaw, substantially as described.

3. In a wrench, the combination with a shank having teeth on one edge and a fixed jaw at one end, of a movable jaw mounted to move on said shank and provided with teeth arranged to engage the teeth on the shank, a finger-piece extending outward from the lower outer end of the movable jaw, a spring-actuated locking-key mounted to move longitudinally between the shank and movable jaw, and a finger-piece on the outer end of said key arranged in close relation to and facing the finger-piece on the movable jaw, substantially as described.

4. In a wrench, the combination with a shank having a fixed jaw at one end, of a movable jaw mounted to move on said shank and provided with a depression, a coiled spring housed in said depression and supported by the walls thereof, a locking-key mounted to move longitudinally between the shank and movable jaw and provided with a lip against which one end of the said spring acts to normally hold the key in its locking position, and a finger-piece on the outer end of the said locking-key, substantially as described.

5. In a wrench, the combination with a shank having a serrated edge and a fixed jaw, of a movable jaw mounted to move on said shank and provided with teeth arranged to engage the serrations on the shank, a finger-piece extending outward from the lower end of the movable jaw, a coiled spring seated in a depression in the lower wall of the movable jaw, a locking-key mounted to move longitudinally between the shank and latter-named jaw, a lip on said key projecting into the said depression in the jaw and against which the said spring acts to normally force the key to its locking position, and a finger-piece on the outer end of the key facing the finger-piece on the movable jaw, substantially as described.

6. In a wrench, the combination with a shank having a serrated upper edge and a fixed jaw at one end, of a movable jaw mounted to slide on said shank and provided with teeth arranged to engage the serrations on the shank, a finger-piece extending outward from the lower end of the movable jaw, a coiled spring seated in a depression formed in the lower wall of the movable jaw, a locking-key mounted to move longitudinally between the shank and last-named jaw and having an inclined face acting against the latter, a lip on said key projecting into the said depression in the jaw and against which the said spring acts to normally force the key to its locking position, a finger-piece on the outer end of the key facing the finger-piece on the movable jaw, and a lug for normally holding the finger-pieces separated, substantially as described.

In testimony whereof I have hereunto set my hand in presence of two subscribing witnesses.

JOHN LEE, SR.

Witnesses:
C. F. WISSLER,
JOHN LEE, Jr.